US008264918B2

(12) United States Patent
Hashimoto et al.

(10) Patent No.: US 8,264,918 B2
(45) Date of Patent: Sep. 11, 2012

(54) NEAR-FIELD RECORDING DEVICE HAVING HEATING MECHANISM POSITIONED NEAR A TRAILING SIDE OF A MAGNETIC POLE

(75) Inventors: Mitsuhiro Hashimoto, Kanagawa (JP); Takuya Matsumoto, Tokyo (JP); Fumiko Akagi, Tokyo (JP); Yoshio Suzuki, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 66 days.

(21) Appl. No.: 12/537,141

(22) Filed: Aug. 6, 2009

(65) Prior Publication Data
US 2010/0033865 A1   Feb. 11, 2010

(30) Foreign Application Priority Data
Aug. 6, 2008  (JP) ................................ 2008-202574

(51) Int. Cl.
*G11B 11/00* (2006.01)
(52) U.S. Cl. .................... 369/13.33; 369/13.13; 360/59
(58) Field of Classification Search .................... 360/59; 369/13.33, 13.32, 13.13, 112.09, 112.14, 369/112.21, 112.27; 358/129; 250/201.3, 250/201.5
See application file for complete search history.

(56) References Cited

U.S. PATENT DOCUMENTS

| | | | |
|---|---|---|---|
| 6,185,063 B1 | 2/2001 | Cameron | 360/78.04 |
| 6,947,236 B2 * | 9/2005 | Hamamoto et al. | 360/59 |
| 2001/0006436 A1 * | 7/2001 | Akiyama et al. | 360/59 |
| 2002/0018312 A1 * | 2/2002 | Hamamoto et al. | 360/59 |
| 2005/0163962 A1 * | 7/2005 | Kawato et al. | 428/65.3 |
| 2006/0187564 A1 * | 8/2006 | Sato et al. | 360/59 |
| 2007/0096854 A1 | 5/2007 | Matsumoto et al. | 335/208 |
| 2007/0177302 A1 * | 8/2007 | Shimazawa et al. | 360/59 |
| 2008/0024896 A1 * | 1/2008 | Ohta et al. | 360/59 |
| 2008/0151431 A1 * | 6/2008 | Tanaka et al. | 360/59 |

(Continued)

FOREIGN PATENT DOCUMENTS

| | | |
|---|---|---|
| JP | 02256503 | 10/1990 |
| JP | 2007128573 | 5/2007 |

OTHER PUBLICATIONS

Saga, Hideki et al., "New Recording Method Combining Thermo-Magnetic Writing and Flux Detection" Japan Journal of Applied Physics, vol. 38 (1999) pp. 1839-1840, Part 1, No. 3B, Mar. 1999.

(Continued)

*Primary Examiner* — Tan X Dinh
(74) *Attorney, Agent, or Firm* — Zilka-Kotab, PC

(57) ABSTRACT

One purpose of the invention according to one embodiment is to provide a magnetic recording apparatus of high recording density in which magnetization transition curvature amount of a recording pattern is small. In one embodiment, the center of a heating area is arranged at a track edge side of a recording pattern as compared with the width-direction center position of a main magnetic pole of a recording head, and a recording magnetic field is applied while a medium is locally heated at the time of signal recording. A switching magnetic field of the medium is locally reduced by heating, so that a line where the switching magnetic field of the medium is equal to the recording magnetic field from the head approaches the heating center position, and a desired recording pattern in which the transition curvature amount is reduced can be realized. Other systems and methods are also presented.

14 Claims, 13 Drawing Sheets

U.S. PATENT DOCUMENTS

| | | | |
|---|---|---|---|
| 2008/0158709 A1* | 7/2008 | Tanaka et al. | 360/59 |
| 2008/0192376 A1* | 8/2008 | Tanaka et al. | 360/59 |
| 2010/0020431 A1* | 1/2010 | Shimazawa et al. | 360/59 |
| 2010/0103553 A1* | 4/2010 | Shimazawa et al. | 360/59 |
| 2010/0123967 A1* | 5/2010 | Batra et al. | 360/59 |
| 2010/0149930 A1* | 6/2010 | Komura et al. | 369/13.33 |
| 2011/0026377 A1* | 2/2011 | Shimazawa et al. | 369/13.24 |

OTHER PUBLICATIONS

Moser, A. et al., "Perpendicular magnetic recording technology at 230 Gbit/in$^2$" Journal of Magnetism and Magnetic Materials 303 (2006) 271-275 www.elsevier.com/locate/jmmm.

* cited by examiner (a)

(b)

(a)

(b)

NEAR-FIELD RECORDING DEVICE HAVING HEATING MECHANISM POSITIONED NEAR A TRAILING SIDE OF A MAGNETIC POLE

RELATED APPLICATIONS

The present application claims the priority of a Japanese patent application filed Aug. 6, 2008 under application number 2008-202574, which is incorporated herein by reference.

FIELD OF THE INVENTION

The present invention relates to a magnetic recording method and a magnetic recording apparatus, and particularly to a magnetic recording apparatus which enables high-density recording by locally heating a recording medium by a heating source and by performing magnetic recording.

BACKGROUND OF THE INVENTION

As a device capable of recording large capacity data, a magnetic recording apparatus is a basic technology to support the present high information society. In the magnetic recording apparatus, data on a recording medium is read and written by a magnetic head. In order to increase the recording capacity per unit area of a magnetic disk, it is necessary to raise bit areal recording density. In order to increase the recording density, it is necessary to increase linear recording density and track density while a specified signal-to-noise ratio is ensured.

In order to improve the linear recording density, it is effective to reduce a media noise caused by irregularity of a recording pattern recorded on the medium and to improve signal quality by improving the readback signal resolution. The magnetic recording medium is an aggregate of magnetic crystal grains. Although the media noise can be reduced by micronizing the magnetic crystal grains, a problem occurs in that the grains become thermally unstable. Accordingly, in order to micronize the crystal grains while the thermal stability is ensured, it is effective to increase magnetic anisotropic energy Ku of the medium. However, the increase of the magnetic anisotropic energy Ku for inversion to increase causes a switching magnetic field, and accordingly, the recording magnetic field intensity of a head is also increased.

On the other hand, one way to increase the track density is to narrow the recording core width of the magnetic recording head. However, the narrowing of the recording core width reduces the recording magnetic field intensity. Besides, there is a limit in increase of the recording magnetic field intensity by the optimization of the recording magnetic pole material and the structure of the recording head. When the recording magnetic field intensity is insufficient as compared with the switching magnetic field of the medium, that is, when the recording capacity is lowered, part of bits cannot be inverted, and the signal quality is reduced.

Thus, it is difficult to micronize the crystal grains of the recording medium and to narrow the track width of the recording head while the thermal stability of the recording medium and the recording capacity of the recording head are maintained. This is because the improvement of the signal quality, the securing of the thermal stability of the recording medium, and the maintaining of the recording capacity of the recording head trade-off. This problem is called a trilemma. As a method of resolving the trilemma, the following two methods are considered.

As the first method of solving the trilemma, a heat assist magnetic recording system is proposed in which a recording medium having a large magnetic anisotropic energy Ku is used, and at the same time as the timing when a recording magnetic field is applied or just before that, the medium is heated to temporarily reduce the switching magnetic field and recording is performed. See Japan Journal of Applied Physics, 38, Part 1, 1839 (1999). In the heat assist magnetic recording apparatus, it is desirable that the spot size of irradiated light is a size comparable to the recording width of a recording pattern. This is because, when the spot size of light is excessively larger than the recording width, a track adjacent to the recorded track is also heated, and the thermal stability is degraded. Since the bit size of the magnetic recording apparatus is smaller than the wavelength of light, a minute area not larger than the wavelength is heated. As a technique to heat such a minute area, a technique of generating a near-field light is proposed. The near-field light is a localized electromagnetic field existing in the vicinity of a minute material not larger than the light wavelength, and is generated by using a minute, aperture having a diameter not larger than the light wavelength or a light scattering body of metal. See Jap. Pat. Appl. No. JP-A-2007-128573. Incidentally, the spot size is defined as a width in which the amount of reduction of the switching magnetic field of a magnetic recording medium is half the amount of reduction at the heating center position.

As the second method, there is a shingle recording system. See U.S. Pat. No. 6,185,063. This is different from a related art random access system, and is a method in which overwriting is performed in one direction of a track width direction from a certain track to an adjacent track. Even if a recording track width is wide, a next track is overwritten while a part of a track on one side remains, and therefore, a track narrower than the recording track width can be formed. Thus, the core width is not always narrowed, and the problem where the writing capacity of the head is reduced can be avoided.

The readback signal resolution in the magnetic recording apparatus is determined by the transition width between bits of a recording pattern and the resolution of readback sensitivity of the reproducing head. In order to raise the resolution of the recording pattern, irrespective of a recording system, a rectangular shape of the recording pattern is preferred. This is because when a recording pattern which does not have a recording system, there is a problem that the transition shape of the recording pattern recorded on the recording medium by the rectangular shape is reproduced by a giant magnetoresistive (GMR) head or a tunneling magnetoresistive (TMR) head, the transition width between bits appear large, and the readback signal resolution is reduced. However, in current recording systems, there is a problem that the transition shape of the recording pattern recorded on the recording medium by the recording head is curved at a track edge as compared with the track center.

This is due to the recording magnetic field distribution from the recording head not being rectangular. The transition position of the recording bit is determined by a line where the switching magnetic field of the medium at a downstream side in a medium rotation direction, i.e., at a trailing side, is equal to the recording magnetic field. As shown in FIG. 1A, an example having a contour 21 of a recording magnetic field intensity generated from a magnetic pole has a distribution which is expanded toward the outside. Thus, at the track edge of the recording pattern, the phase of the transition position advances as compared with the track center, and as shown in FIG. 1B, the transition shape of the recording pattern 31 has a curved shape. The transition curvature of the recording pattern as stated above is clarified by observation using a magnetic force microscope. See Japan Journal of Applied Journal of Magnetism and Magnetic Materials. Vol. 303, pp.

271-275 (2006). That the transition shape of the recording patterns is curved as stated above is called magnetization transition curvature, and a distance 34 between a position where the phase is most delayed and a position where the phase is most advanced is called a magnetization transition curvature amount. An arrow 32 indicates a head traveling direction, and an arrow 35 indicates a tract width direction.

SUMMARY OF THE INVENTION

According to one embodiment, a magnetic recording apparatus comprises a magnetic recording medium, and a magnetic pole for applying a recording magnetic field to the magnetic recording medium. The magnetic pole includes heating means for locally heating the magnetic recording medium, wherein the heating means heats a position shifted in a track edge direction from a track width direction center at a trailing side of the magnetic pole.

In another embodiment, a magnetic recording method for magnetically recording information to a magnetic recording medium comprises applying a recording magnetic field from a recording magnetic pole to the magnetic recording medium, and locally heating a position shifted in a track edge direction from a track width direction center at a trailing side of the recording magnetic pole.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and tie appended claims, the singular forms "a," "an" and "the" include plural referents unless otherwise specified.

The following description discloses several preferred embodiments of disk-based storage systems and/or related systems and methods, as well as operation and/or component parts thereof.

Figure 1:
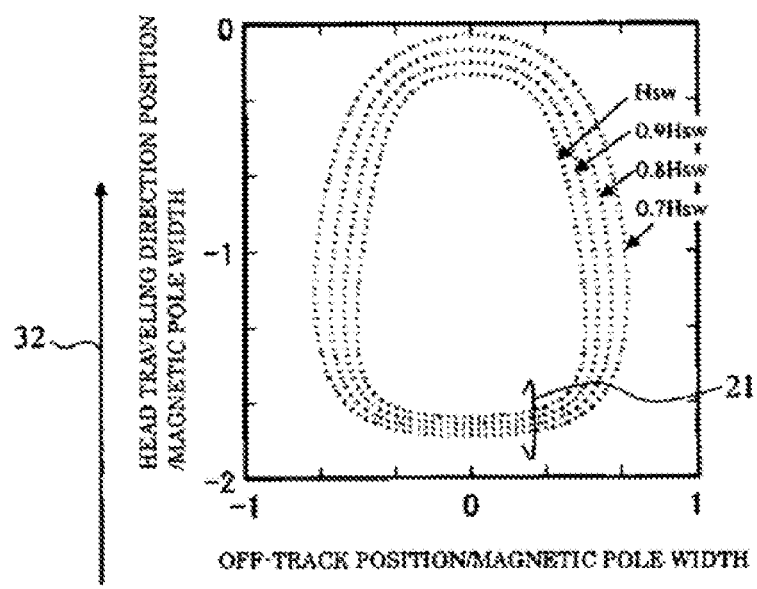
FIG. 1A is a schematic view showing a contour of an edge recording magnetic field intensity.
FIG. 1B shows a shape of a recording bit from FIG. 1A.
Figure 1:
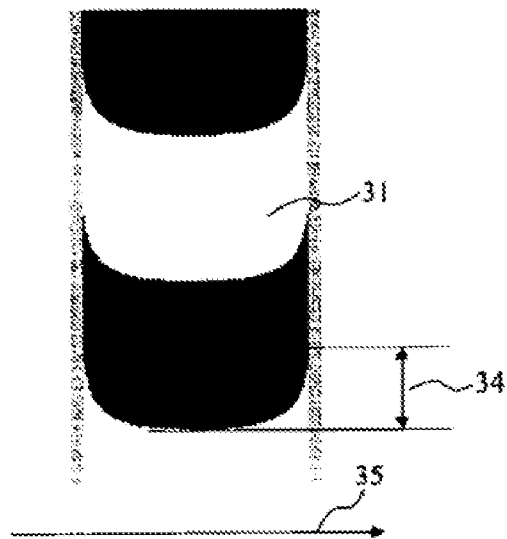
Figure 2:
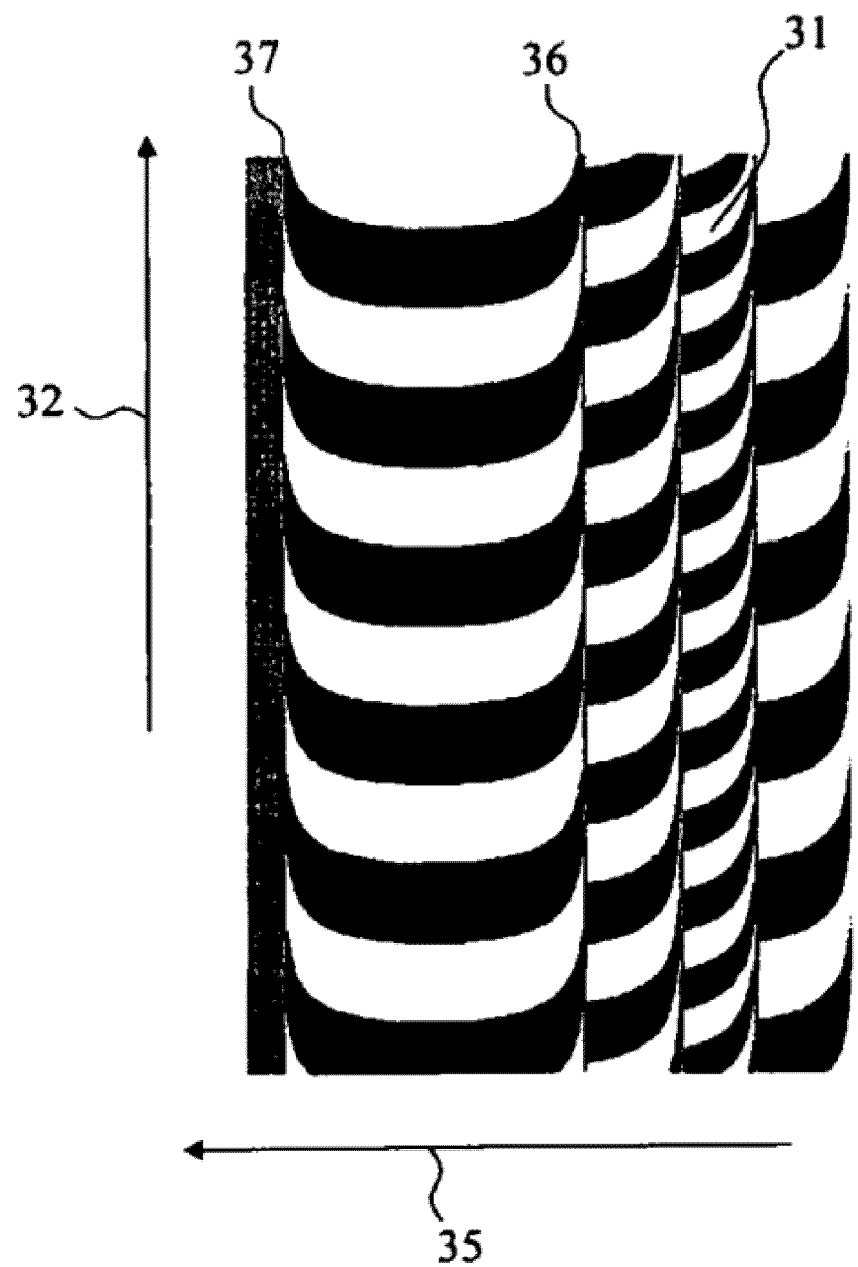
FIG. 2 is an explanatory view of a recording pattern in a shingle recording system.

As in disclosed in Jap. Pat. Appl. No. JP-A-2002-56503, which is hereby incorporated by reference, the problem of the transition curvature of the recording pattern exists also in the heat assist magnetic recording. In heat assist recording, the recording medium is locally heated at the time of recording, and the switching magnetic field is temporarily reduced. Since the switching magnetic field distribution at the time of application of the recording magnetic field is circular, the magnetization transition curvature amount of the recording pattern is large as compared with the case of non-thermal recording not using heat assist. Besides, as shown in FIG. 2, with respect to a recording pattern in the shingle recording, although an edge 37 (overwriting edge) on a track traveling side is overwritten, the transition curvature remains at the reverse side edge (remaining edge) 36. Thus, the transition curvature of the recording pattern is a factor to degrade the resolution of a readback signal also in shingle recording.

As stated above, when the recording pattern in which the transition shape is curved is reproduced by a giant magnetic resistance effect element (GMR) head or a tunneling magnetic resistance effect element (TMR) head, the transition width between bits appears large and the readback signal resolution is reduced. Thus, the linear recording density cannot be improved. Besides, as the distance between the center positions of the reproducing head and the recording pattern becomes wide, the degree of reduction of the readback resolution due to the curvature of the transition shape of the recording pattern becomes large.

According to one embodiment, a magnetic recording apparatus of high recording density is provided in which the magnetization transition curvature amount of a recording pattern is small.

According to one embodiment, in a magnetic recording apparatus using means for locally heating a medium by near-field light or the like, a center of a heating area is arranged at a track edge side of a recording pattern as compared with a width-direction center position of a main magnetic pole of a recording head, and a recording magnetic field is applied while the medium is locally heated at a time of signal recording. A switching magnetic field of the medium is locally reduced by heating, so that a line where the switching magnetic field of the medium is equal to the recording magnetic field from the head approaches the heating center position, and the recording pattern in which a transition curvature amount is reduced can be realized.

According to one embodiment, the readback signal resolution can be improved by the reduction of the magnetization curvature amount of the recording pattern, and the magnetic recording apparatus of high recording density can be provided.

Figure 3:
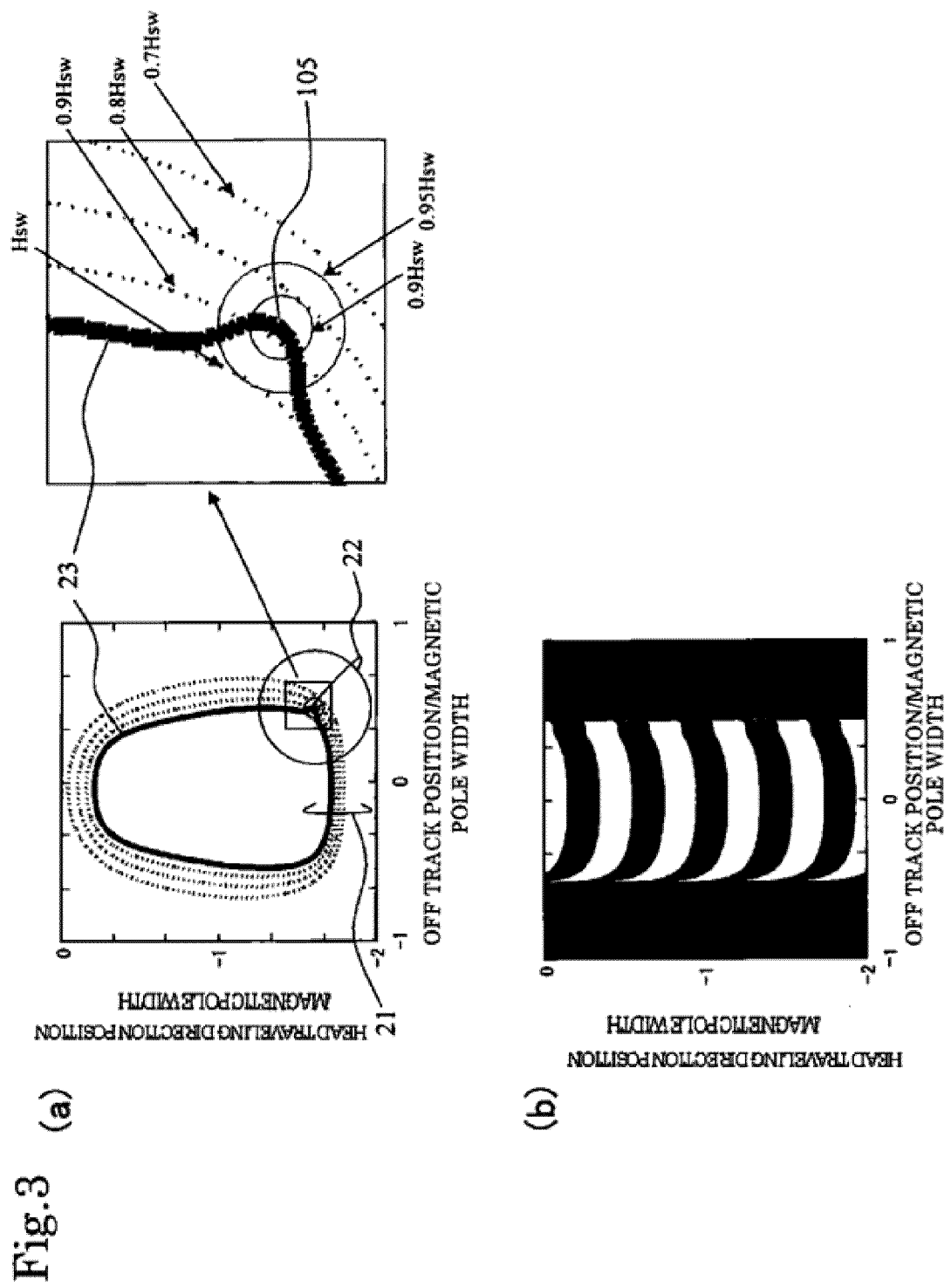
FIG. 3A is a schematic view showing a recording magnetic field intensity at the time of medium heating, a contour of a medium switching magnetic field, and a recording area.
FIG. 3B shows a shape of a recording bit from FIG. 3A.

FIGS. 3A and 3B are conceptual views for explaining the operation and effect of a recording method according to one embodiment. FIG. 3A is a view showing a contour 21 of a recording magnetic field intensity and a contour 22 of a medium switching magnetic field when heating is preformed mainly at a track right end on a trailing side. Here, the switching magnetic field means a magnetic field by which medium magnetization is inverted when a perpendicular magnetic field is applied at the temperature for a time of about $10^{-9}$ seconds. The switching magnetic field of a heated medium is reduced concentrically so that it become minimum at the heating center as indicated by the contour 21. In one embodiment, since heating is performed while the center of heating means is arranged at the track edge side of the recording pattern as compared with the width-direction center position of the main magnetic pole of the recording head, the switching magnetic field of the medium at the track edge of the recording pattern becomes lower than that at the center of the recording pattern. Since inversion is performed by a lower recording magnetic field at the track edge side, at a line 23 where the recording magnetic field intensity is equal to the medium switching magnetic field, the phase is delayed as compared with the case where heating is not performed, and the phase advance can be reduced. As a result, as shown in FIG. 3B, the transition curvature amount of the recording pattern at the heating side can be reduced as compared with the transition curvature amount at the non-heating side.

Here, in order to simply describe the effect of the invention, according to one embodiment, the case is shown where only one end at the trailing side in the recording magnetic field application area by the recording head is heated. The method of heating only the one end at the trailing side of the recording magnetic field application area is effective in the shingle recording when the remaining edge side is heated. Besides, in application to normal magnetic recording in which tracks are separated, when right-and-left both edges at a trailing side of a recording magnetic field application area are heated, the right-and-left both magnetization transition curvatures at the trailing side of the recording pattern are reduced and the pattern shape can be made to approach a rectangular shape.

Hereinafter, the invention will be described in more detail by use of embodiments.

EMBODIMENT 1

Figure 4:
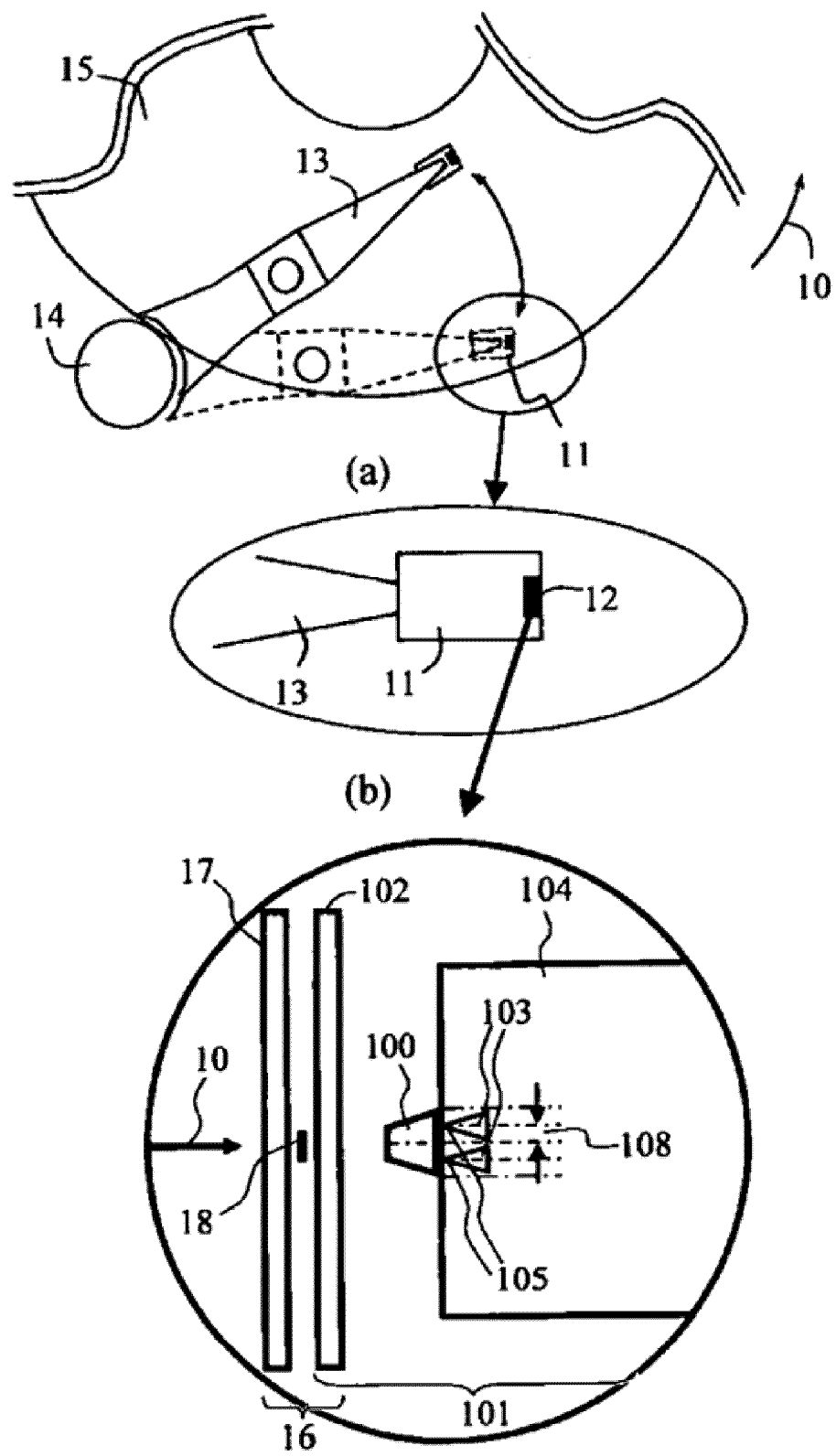
FIG. 4 is a schematic view showing a structure of a magnetic disk apparatus, according to one embodiment.

FIG. 4 is a view showing a structural example of a magnetic recording apparatus of the invention. In general, one or several magnetic disks 15 are mounted in a drive of the magnetic recording apparatus. The magnetic disk 15 of this embodiment is a disk for perpendicular magnetic recording including a soft magnetic ground layer and a perpendicular magnetic recording layer, and is rotated and driven in a direction of an arrow 10. As shown in an enlarged view in (a), a magnetic head 12 at the rear end of a magnetic head slider 11, fixed to a tip of a carriage 13, accesses an arbitrary track by a voice coil motor 14, and records and reproduces information on the magnetic disk (medium). An enlarged view (b) is a schematic view seen from a medium opposite surface and showing a stricture of a recording head 101 to perform recording and a reproducing head 16 to perform reproduction. The recording head 101 is a single magnetic pole recording head for perpendicular magnetic recording and includes a main magnetic pole 100, a light waveguide 104 and a conductive light scattering body 103. The shape of the conductive light scattering body 103 is a plain triangular shape, and its material is Au having conductivity. It is desirable that the length of the base of the triangle is 100 nm or less.

Magnetic recording is performed by a magnetic field leaked from the main magnetic pole 100 to the medium 15 locally heated by near-field light emitted from the conductive light scattering body, according to one embodiment. The reproducing head 16 includes a reproducing element 18 made of a magnetic resistance effect element arranged between a magnetic shield 17 and a magnetic shield 102 serving also as an auxiliary magnetic pole, and a leak magnetic flux from the medium 15 flows into the reproducing element 18, so that reproduction output is obtained.

Figure 5:
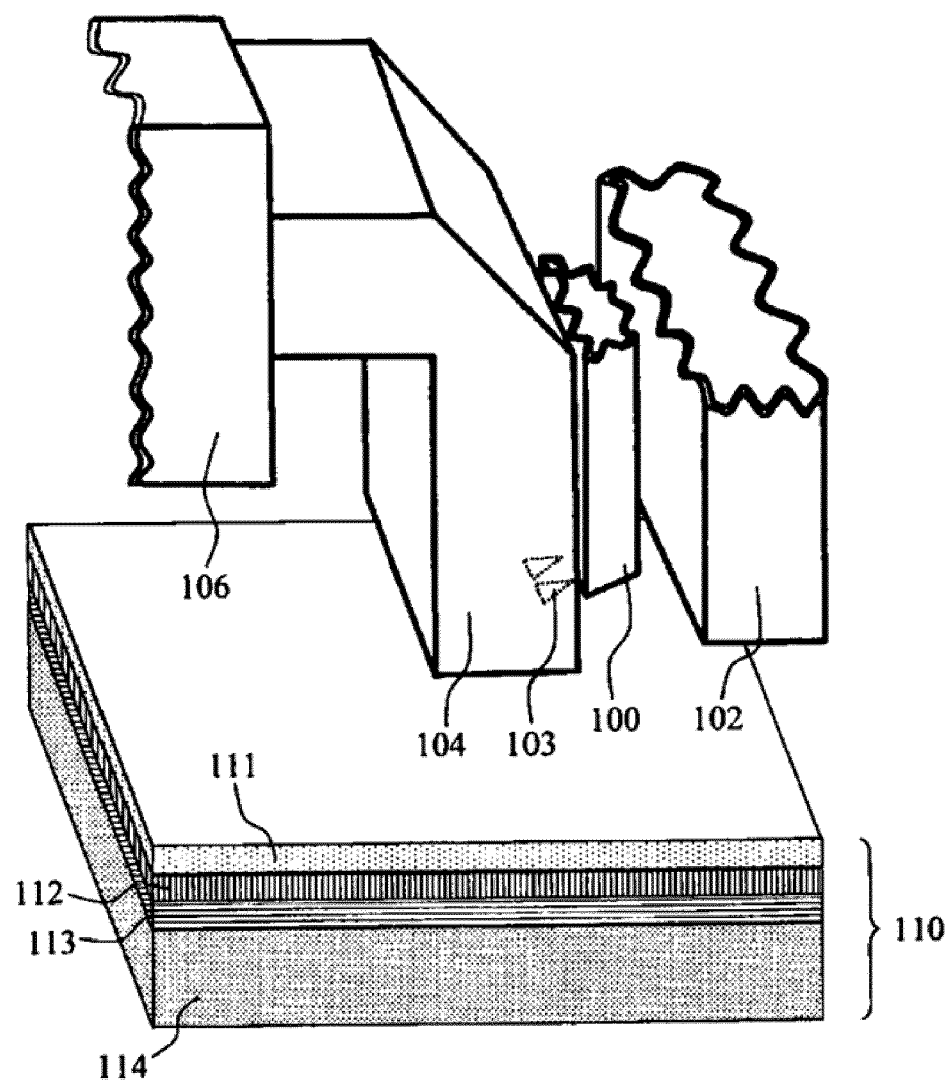
FIG. 5 shows a schematic view of a structural example of a recording head and a recording medium, according to one embodiment.

FIG. 5 is a view showing a structural example of a recording head/medium, according to one embodiment. FIG. 5 is a perspective view of the periphery of the recording head in the case where the recording head and the recording medium are cut along a plane perpendicular (up-and-down direction in the drawing) to the recording medium surface and parallel to a track traveling direction.

A recording medium 110 is formed by sputtering a soft magnetic layer 113, a non-magnet intermediate layer 112, and a CoCr alloy recording layer 111 in sequence on a crystallized glass substrate 114. The non-magnetic intermediate layer 112 is, for example, Ru, Pt, Pd or Ni alloy, and is provided to control the crystalline orientation of the magnetic recording layer 111. The soft magnetic layer 113 is magnetically coupled with the magnetic head, and functions to intensify and sharpen the recording magnetic field more. As the CoCr alloy recording layer 111, for example, a granular recording layer in which oxygen or oxide is added to a CoCrPt alloy is used.

Hereinafter, a result of study obtained by calculator simulation on the effect of the invention will be described. It is assumed that with respect to the distribution of a switching magnetic field of a recording medium, the amount of reduction conforms to Gaussian distribution as shown in Equation 1.

$$H_{sw}(r) = H_{sw\_nh} - \Delta H_{sw} \exp(-4r^2/R_s^2)$$ Equation 1

Here, $H_{sw}(r)$ denotes a switching magnetic field distribution, $H_{sw\_nh}$ denotes a switching magnetic field at the time of non-heating, $\Delta H_{sw}$ denotes the amount of reduction of the switching magnetic field at the heating center position, r denotes a distance from the heating center, and $R_s$ denotes an amount to determine a size of a heating area. When a spot size $W_s$ is defined as a width in which the amount of reduction of the switching magnetic field is half the amount of reduction at the heating center position, $W_s$ is about 0.84 times larger than $R_s$.

The near-field light is generated by making light incident on the two planar triangular conductive light scattering bodies 103 arranged side by side in an off-track direction, according to one embodiment. As shown in FIG. 4, view (b), a distance 108 between the track width direction center position of the main magnetic pole 100 and the near-field light generation position is defined as an offset amount. The magnetic pole width of the main magnetic pole 100 is 150 nm, the switching magnetic field of the recording medium is 8 kOe, and the amount of reduction of the switching magnetic field at the heating center position by one near-field light is 1 kOe. Since the magnetic field intensity of the magnetic pole is higher than the switching magnetic field of the medium, the recording width is determined substantially by the width of the magnetic pole.

Figure 6:
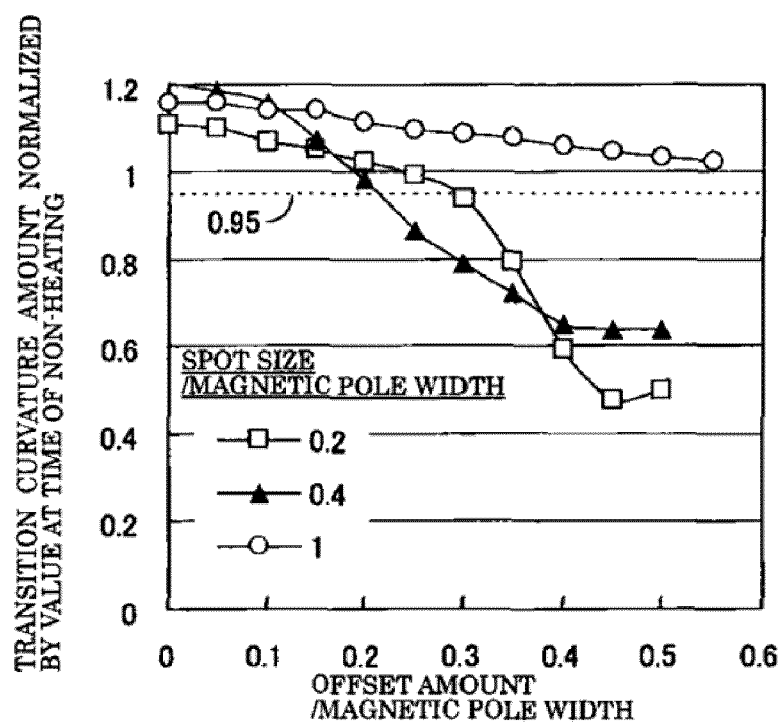
FIG. 6 is a plot showing a relation between a transition curvature amount of a recording bit and an offset amount of heating center position in a case where a switching magnetic field of a medium at the time of non-heating is lower than recording intensity of a magnetic pole.

FIG. 6 shows the offset amount dependency of the transition curvature amount of the recording bit and shows an example of results obtained by calculation while the spot size is changed. The horizontal axis indicates the offset amount normalized by the magnetic pole width. With respect to the vertical axis, in order to indicate the effect obtained by heating the offset position, normalization is performed by the transition curvature amount in the case where recording is performed without heating. When the value of the vertical axis is smaller than 1, this means that the curvature of the recording bit is reduced by the effect of the invention. When smaller than a dotted line of 0.95 in the drawing, a clear improvement effect of 5% or more is obtained. Incidentally, when the heating center position is arranged outside of the track edge, an adjacent track has higher temperature than the recording track, and the adjacent track is erased. Thus, the condition that the heating center position is outside of the edge of the recording track is omitted from the calculation result.

Figure 7:
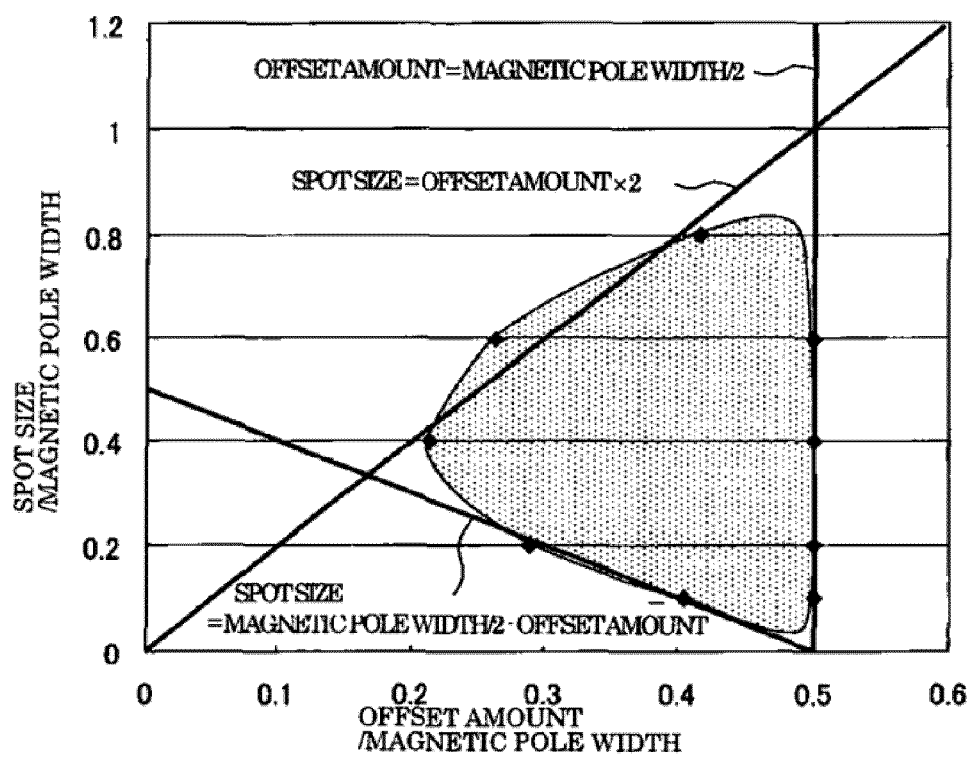
FIG. 7 is a view of a contour showing a relation among a spot size where magnetization transition curvature amount in a case where the switching magnetic field of a medium at the time of non-heating is lower than the recording intensity of a magnetic pole is within 5% of that at the time of non-heating, a magnetic pole width, and an offset amount of heating center position.

From the plot of FIG. 6, as the offset amount becomes large, the transition curvature amount is reduced. However, as compared with that at the time of non-heating, the condition under which the reduction effect is obtained varies according to the spot size. Then, the conditions under which the clear improvement effect of 5% or more is obtained as compared with that at the time of non-heating are set in order. In FIG. 7, the horizontal axis indicates the offset amount normalized by the magnetic pole width, the vertical axis indicates the spot size normalized by the magnetic pole width, and points where the transition curvature amount is reduced by 5% as compared with that at the time of non-heating are connected and are shown as a contour. The transition curvature amount is reduced by 5% or more in the inside of the area surrounded by the line.

From the plot of FIG. 7, it is understood that when the magnetic pole width, the spot size, and the offset amount satisfy the following three relational expressions, the transition curvature amount is reduced by 5% as compared with that at the time of non-heating, and the effect of the invention, according to one embodiment, is obtained, as follows:

offset amount<magnetic pole width/2 spot size<offset amount×2 spot size>magnetic pole width/2−offset amount

As described above, according to one embodiment, there is an effect of reducing the transition curvature amount even for the medium in which the switching magnetic field of the medium at the time of non-heating is lower than the magnetic field intensity of the magnetic pole, and the heat assist is not required to record a signal to the medium.

Figure 8:
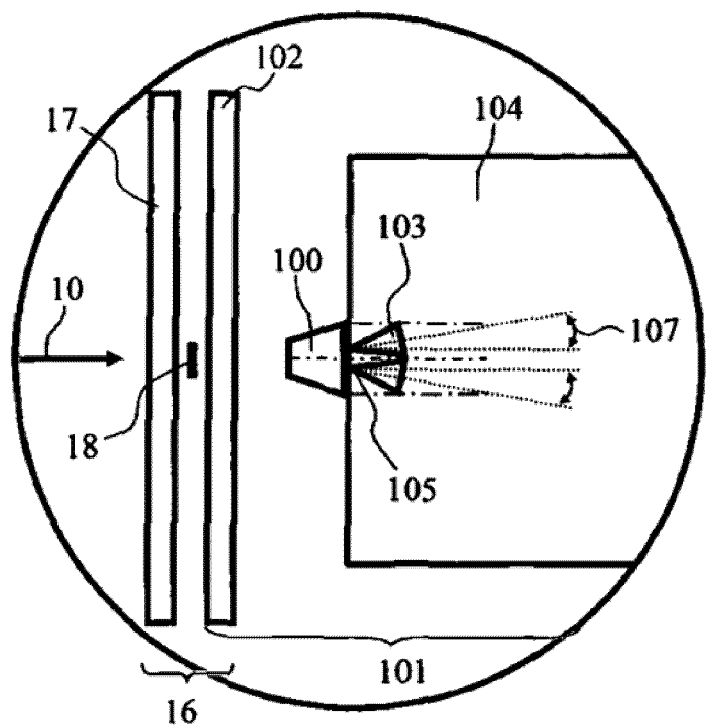
FIG. 8 is a schematic view showing another structural example of a recording head, according to one embodiment.
Figure 9:
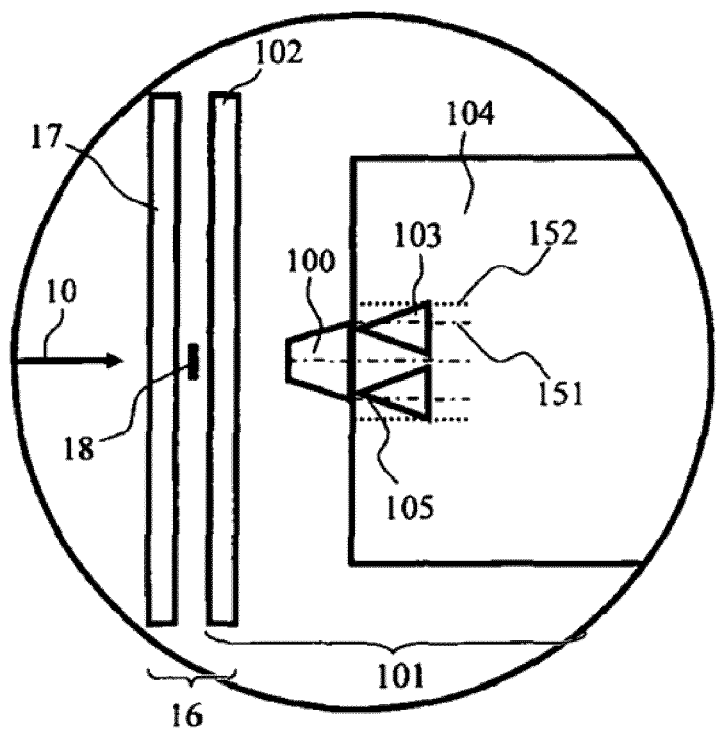
FIG. 9 is a schematic view showing another structural example of a recording head, according to one embodiment.

FIG. 8 and FIG. 9 are schematic views showing other structural examples of a recording head, according to one embodiment. The recording head shown in FIG. 8 is such that an angle 107 between a bisector of an angle of the apex of a conductive light scattering body 103 where near-field light is generated and a medium traveling direction is made an angle other than zero degrees, and two conductive light scattering bodies 103 are arranged to be an "inverted V." When the bisector of the angle of the apex of the conductive light scattering body where the near-field light is generated and the medium traveling direction are the same, the offset amount can not be made smaller than the half of the length of the base of the conductive light scattering body. However, when the two conductive light scattering bodies are arranged to be an "inverted V"-shaped, the offset amount can be made smaller than the length of the base of the conductive light scattering body, and therefore, the degree of freedom of the size and arrangement of the conductive light scattering body can be raised.

The recording head shown in FIG. 9 has such a structure that an outermost position 152 of a conductive light scattering body is outside of an outermost position 151 of a magnetic pole, and a part of the base of the conductive light scattering body protrudes to the outside of a track edge of the magnetic pole. Since near-field light is generated at the apex of a triangle, an influence on an adjacent track is small.

Incidentally, the shape of the conductive light scattering body may be a planar circle, an ellipse, a rectangular parallelepiped, a sphere or the like instead of the triangle.

Figure 10:
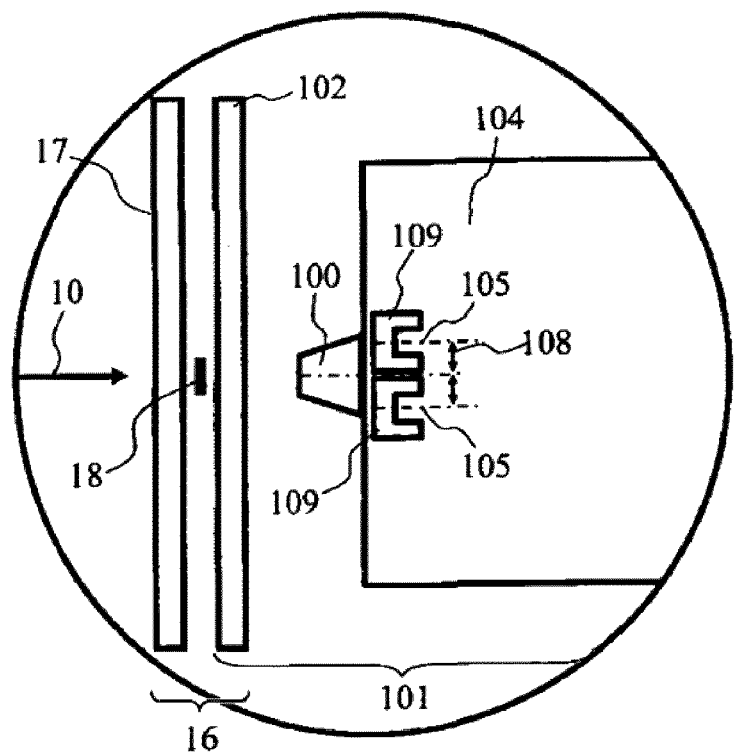
FIG. 10 is a schematic view showing another structural example of a recording head, according to one embodiment.
Figure 11:
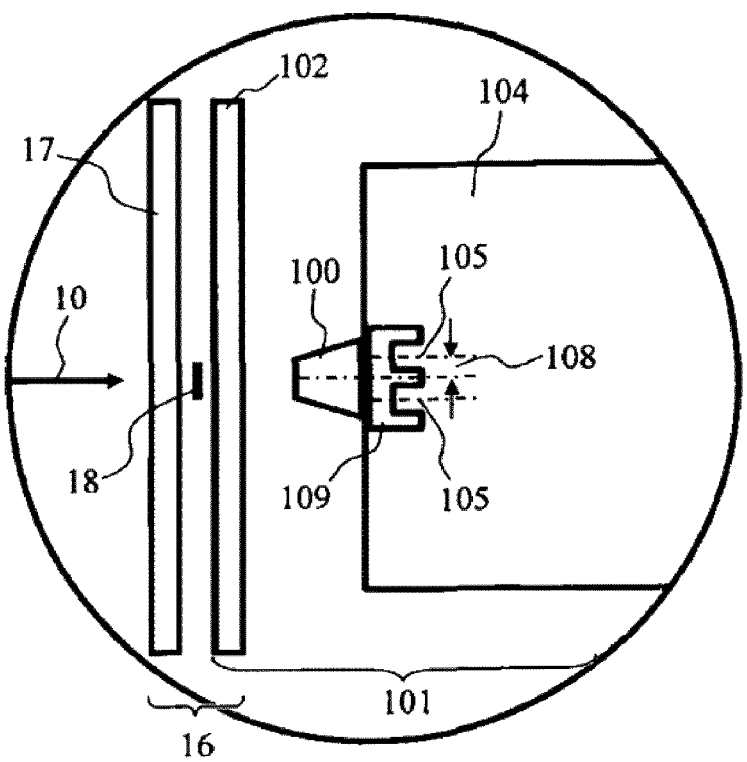
FIG. 11 is a schematic view showing another structural example of a recording head, according to one embodiment.

FIG. 10 and FIG. 11 are schematic views showing other structural examples of a recording head, according to one embodiment. In these recording heads, instead of a triangular conductive light scattering body, a metal having a minute aperture 109 not larger than a light wavelength is formed at the tip of a waveguide. FIG. 10 shows a structure in which two C-shaped apertures are provided at the tip of the waveguide, and FIG. 11 shows a structure in which an E-shaped aperture is provided instead of the two C-shaped apertures. In the case of these structures, near-field light is generated from a protrusion 105 protruding at the aperture 109.

Figure 12:
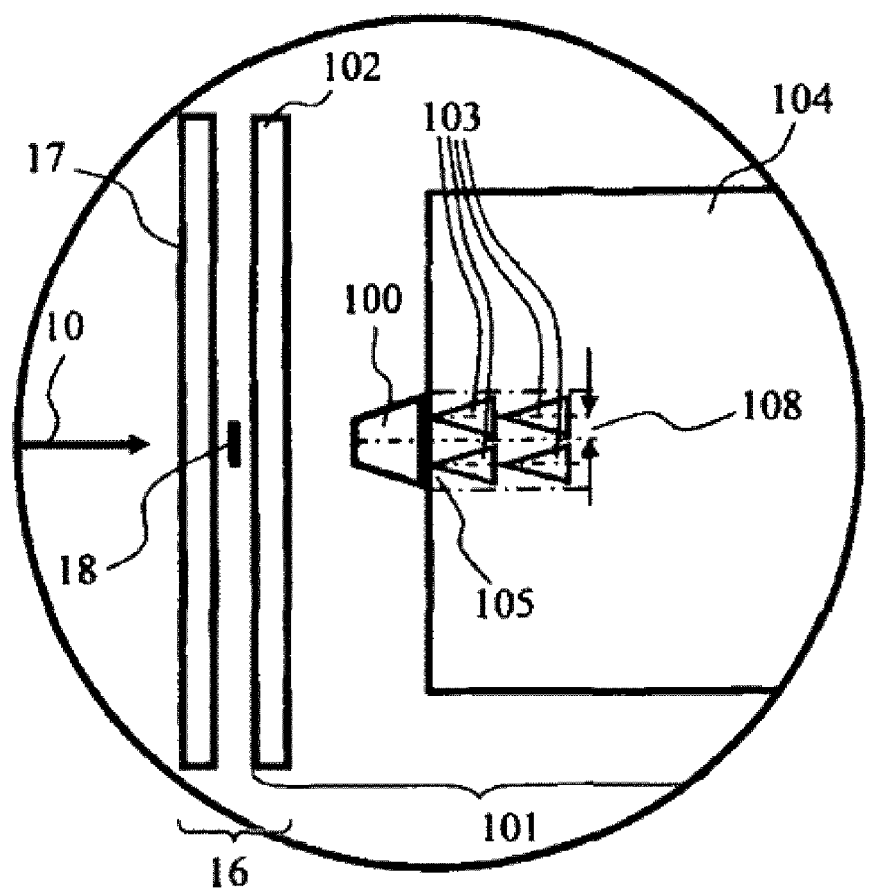
FIG. 12 is a schematic view showing another structural example of a recording head, according to one embodiment.

Incidentally, according to the invention, it is not necessary that the number of the conductive light scattering bodies to generate the near-field light is two, and three or more bodies may be included. As an example, FIG. 12 shows an embodiment where four triangular conductive light scattering bodies are included. The near-field light is generated from each of the conductive light scattering bodies and the medium is locally heated. The effect of the invention, according to one embodiment, is obtained as long as, at the time of recording, the switching magnetic field of the recording medium at the track edge is lower than that at the track center, and the heating means of the recording medium is not limited to the heating by the generation of the near-field light using the conductive light scattering body. For example, heating may be performed by electron beam radiation, heating wire, etc.

EMBODIMENT 2

Since the effect of reduction of the magnetization transition curvature amount of the recording pattern according to the invention is obtained by reducing the switching magnetic field at the track edge side of the recording pattern as compared with the switching magnetic field at the track center, the invention, according to one embodiment, is effective also in normal heat assist recording in which the switching magnetic field at the time of non-heating is higher than the magnetic field intensity of the magnetic pole, and recording can not be performed unless heat assist is used.

Hereinafter, with respect to another embodiment of the invention, a result of study obtained by calculator simulation is described. Structures of a recording head and a magnetic recording medium are the same as those of Embodiment 1. However, the switching magnetic field of the recording medium is 18 kOe and is higher than the applied magnetic field of a magnetic pole, and a pattern cannot be recorded without heating. The amount of reduction of the switching magnetic field at the heating center position by one near-field light is made 6 kOe. Since the magnetic field intensity of the magnetic pole is higher than the switching magnetic field of the medium, the recording width is determined substantially by the spot size.

Figure 13:
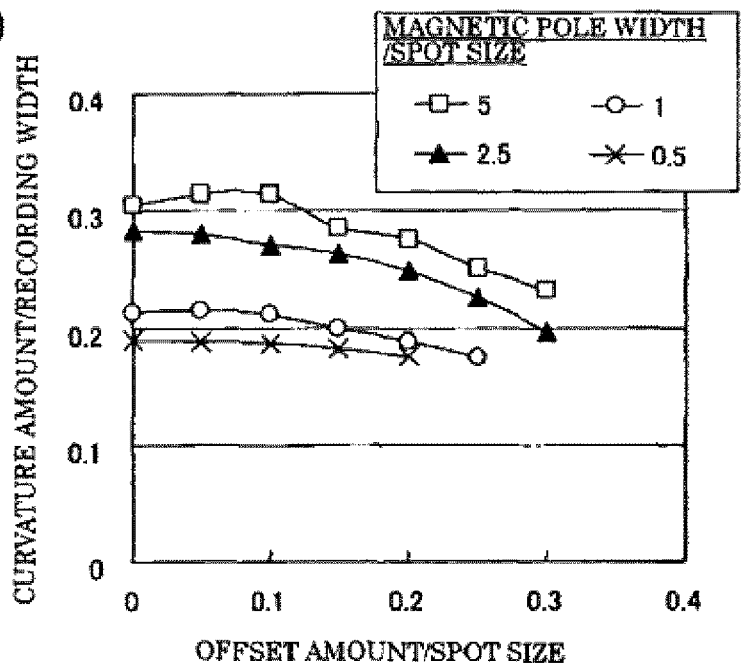
FIG. 13A is a plot showing a relation between transition curvature amount of a recording bit and an offset amount of heating center position when a switching magnetic field of a medium at the time of non-heating is higher than recording intensity of a magnetic pole.
FIG. 13B is a plot showing a relation between transition curvature amount of a recording bit and an offset amount of heating center position when a switching magnetic field of a medium at the time of non-heating is higher than recording intensity of a magnetic pole.
Figure 13:
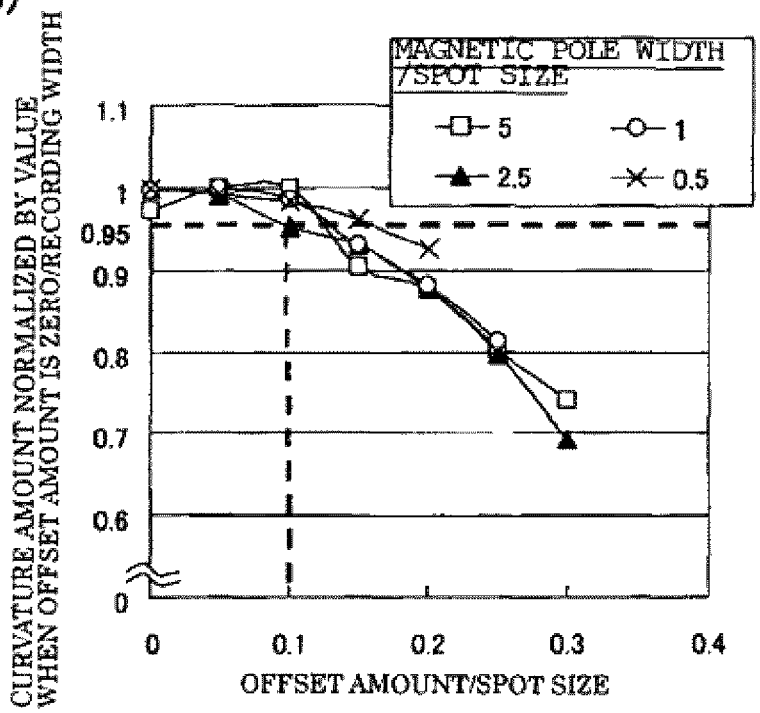

FIGS. 13A and 13B show an example of a result obtained by calculation while the spot size is chanced. The horizontal axis of FIG. 13A indicates a value of an offset amount normalized by the spot size, and the vertical axis indicates a value obtained by dividing a transition curvature amount of a recording pattern by a recording width under each condition. It is meant that the recording pattern shape is such that as the value of the vertical axis becomes small, the transition curvature amount becomes small. Incidentally, when the heating center position is arranged outside of the track edge, the temperature of an adjacent track becomes higher than that of the recording track, and the adjacent track is erased. Thus, the condition that the heating center position is outside of the edge of the recording track is omitted from the calculation result. In any case, when the offset amount is increased, the ratio of the curvature amount to the recording width is reduced, and the effect of the invention can be confirmed. The case where the value of the horizontal axis is 0 corresponds to the related art heat assist recording in which the track center is heated.

Figure 14:
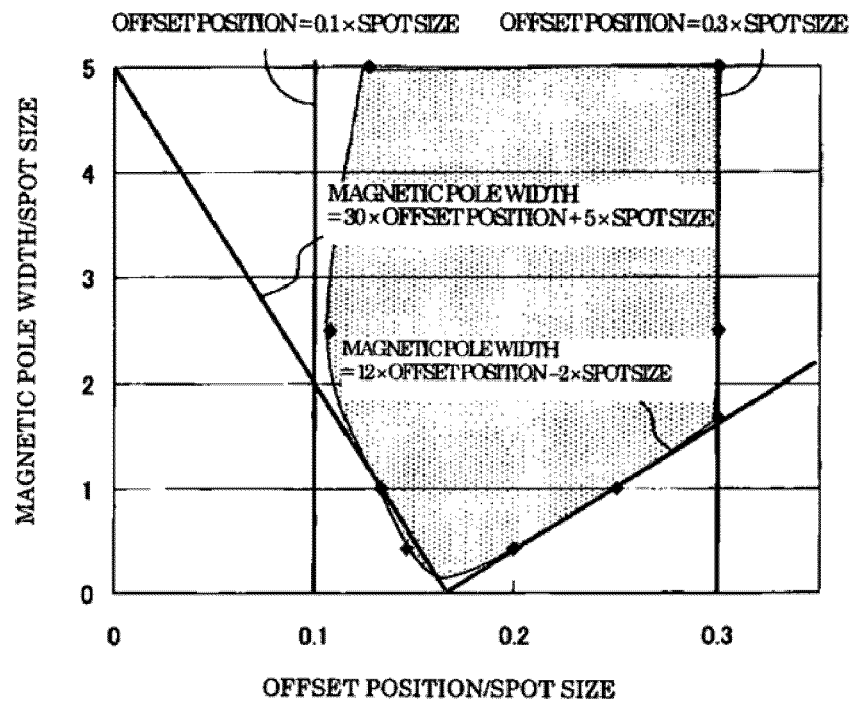
FIG. 14 is a plot of a contour showing a relation among a spot size where magnetization transition curvature amount in a case where the switching magnetic field of a medium at the time of non-heating is higher than the recording intensity of a magnetic pole is

FIG. 13B is a view in which the value of the vertical axis, that is, the ratio of the transition curvature amount to the recording width is normalized by a value of a case where the offset amount is zero. Since the center position of the track is heated in general heat assist recording, it is meant that when the value of the horizontal axis is smaller than 1, the effect of reduction of the transition curvature amount is obtained by the invention. When it is smaller than a dotted line of 0.95 in the drawing, a clear improvement effect of 5% or more can be obtained. From the drawing, as the offset amount becomes large, the transition curvature amount is decreased, and the improvement effect of 5% or more is obtained at the offset amount of 10% or more of the spot size. FIG. 14 is a view in which the horizontal axis indicates the offset position normalized by the spot size, the vertical axis indicates the magnetic pole width normalized by the spot size, and a contour is shown which is obtained by connecting points where the transition curvature amount to the recording width is reduced by 5% as compared with the normal heat assist recording in which the center portion of a track is heated. The ratio of the recording width to the transition curvature amount is reduced by 5% or more in the inside of the area surrounded by the contour. That is, when the magnetic pole width, the spot size, and the offset amount satisfy the following three relational expressions, the clear reducing effect of the transition curvature amount according to one embodiment is obtained, as follows:

0.1×spot size<offset amount<0.3×spot size magnetic pole width>12×offset amount−2×spot size magnetic pole width>−30×offset amount+5×spot size As stated above, according to one embodiment, the effect of reducing the transition curvature amount is obtained even for the medium in which the switching magnetic field of the medium at the time of non-heating is higher than the magnetic field intensity of the magnetic pole, and the heat assist is required to record a signal to the medium.

EMBODIMENT 3

Figure 15:
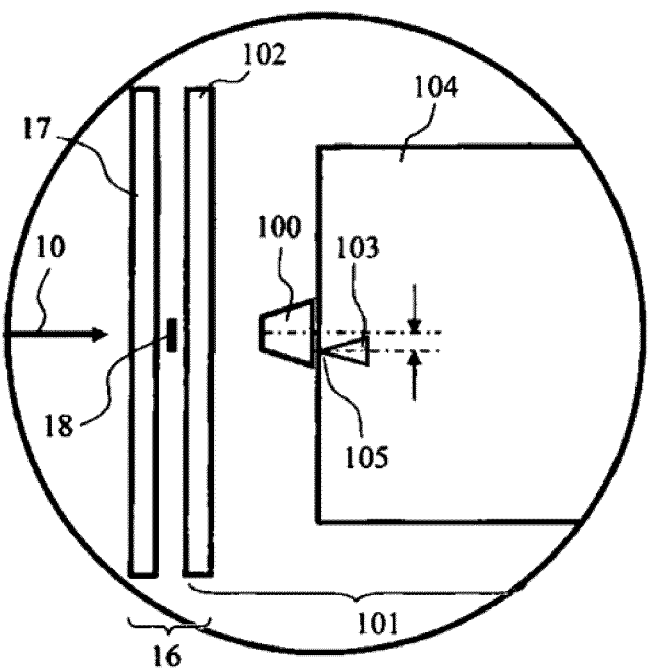
FIG. 15 is a schematic view showing a structural example of a recording head and a recording medium, according to one embodiment.

Next, an embodiment in which the invention is applied to a shingle recording system will be described. FIG. 15 is a schematic view in which a part of a magnetic head of this embodiment is seen from an air bearing surface. This is different from Embodiment 1 and Embodiment 2 in that a conductive light scattering body 103 to generate near-field light is arranged only at a track edge of one side.

Figure 16:
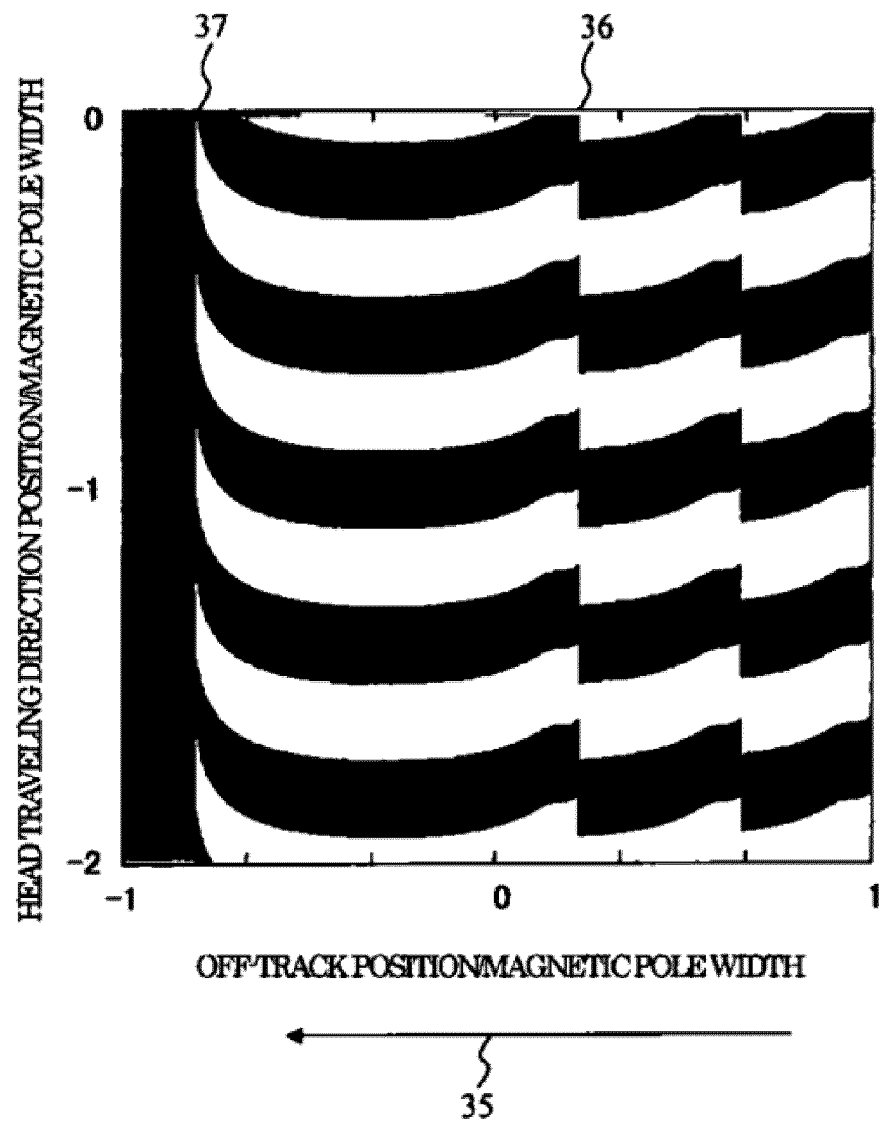
FIG. 16 is a view of a recording pattern in a shingle recording system, which is recorded according to one embodiment.

As in Embodiment 1, when a medium is used in which the switching magnetic field of the recording medium at the time of non-heating is low as compared with the recording magnetic field of a main magnetic pole, the transition curvature amount of an edge at a heating side is reduced as compared with that at the time of non-heating. Thus, when the edge at the heating side is made a remaining edge, a recording pattern in which the transition curvature amount is reduced can be formed as shown in FIG. 16, according to one embodiment.

As in Embodiment 2, when a medium is used in which the switching magnetic field of the recording medium at the time of non-heating is high as compared with the recording magnetic field of a main magnetic pole, the transition curvature amount of an edge closer to the heating center position is reduced. Thus, when the edge at the side where the heating center position is offset is made a remaining edge, a recording pattern in which the transition curvature amount is reduced can be formed.

Figure 17:
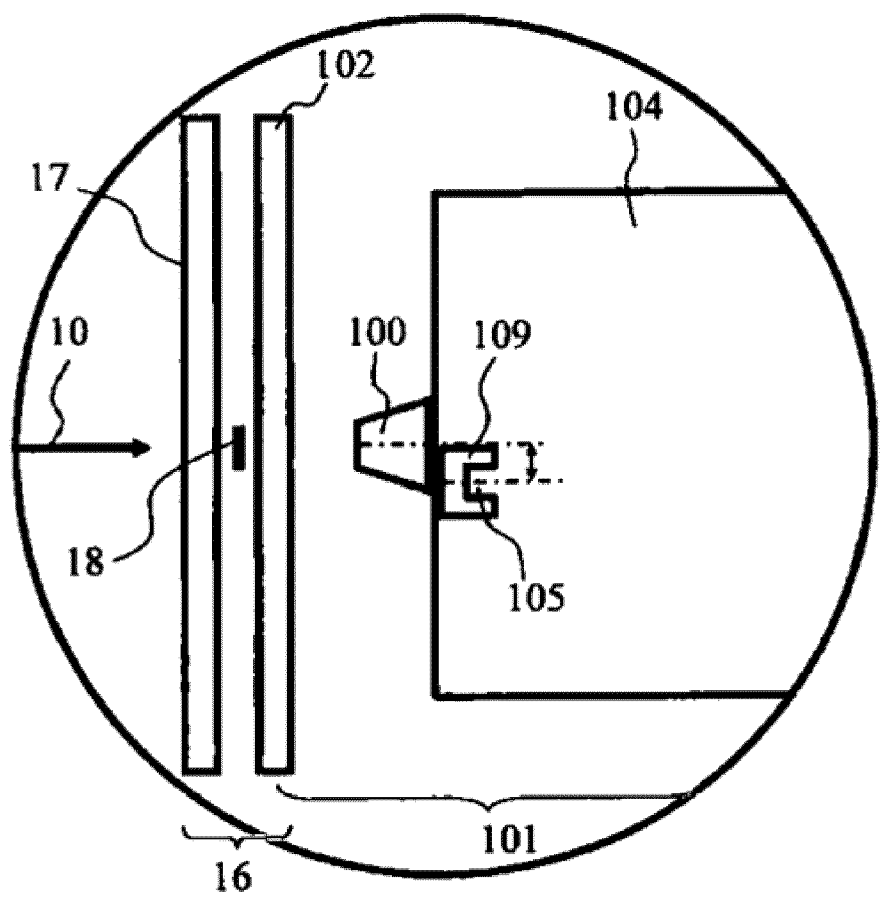
FIG. 17 is a schematic view showing a structural example of a recording head of the invention and a recording medium.

FIG. 17 is a schematic view showing another structural example of the recording head of this embodiment, in which a metal plate having a C-shaped aperture 109, instead of a triangular conductive light scattering body, is provided at the tip of a waveguide.

Incidentally, the number of conductive light scattering bodies to generate near-field light is not limited to one, and may be two or more. In that case, since the transition curvature amount of a track edge at a side where heating temperature is high becomes small, it is appropriate that an edge at a side where heating is performed up to a high temperature is made a remaining edge.

The following list is a description of the reference numerals and signs, and is provided for quick reference to the references consistent throughout the various figures.

10 rotation direction of magnetic disk
11 magnetic head slider
12 magnetic head 13 magnetic head suspension
14 voice coil motor
15 magnetic disk
16 read head
17 lower shield
18 read element
21 contour of recording magnetic field intensity
22 contour of medium switching magnetic field
23 line where recording magnetic field intensity is equal to medium switching magnetic field
31 recording pattern
33 recording pattern of shingle recording system
34 magnetization transition curvature amount
36 remaining edge of recording pattern
37 overwriting edge of recording pattern
100 main magnetic pole
101 write head
102 auxiliary magnetic pole
103 conductive light scattering body
104 waveguide
105 near-field light generating position
106 semiconductor laser
108 offset amount between magnetic pole center position and heating center position
109 minute aperture
110 recording medium
111 magnetic recording apparatus
112 non-magnetic intermediate layer
113 soft magnetic layer
114 substrate
151 outermost position of magnetic pole
152 outermost position of conductive light scattering body While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording apparatus comprises:
   a magnetic recording medium;
   a magnetic head having a magnetic pole for applying a recording magnetic field to the magnetic recording medium; and
   a heating mechanism for locally heating the magnetic recording medium, wherein a center of a heating area is arranged at a track edge side of a recording pattern as compared with a width-direction center position of the magnetic pole.

2. The magnetic recording apparatus according to claim 1, further comprising a plurality of the heating mechanisms arranged side by side in the track width direction at the trailing side of the magnetic pole.

3. The magnetic recording apparatus according to claim 1, further comprising:
   a waveguide for guiding light in a vicinity of the magnetic pole; and
   a light scattering body positioned at a tip of the waveguide, comprised of at least one of a metal having a plurality of minute apertures, and a plurality of conductive light scattering bodies.

4. The magnetic recording apparatus according to claim 3, further including a plurality of light scattering bodies, wherein the light scattering bodies are arranged side by side in the track width direction at a trailing side of the magnetic pole.

5. The magnetic recording apparatus according to claim 1, wherein the heating mechanism includes a plurality of conductive light scattering bodies for generating near-field light and a waveguide for making light incident on the conductive light scattering bodies, wherein the conductive light scattering bodies are triangular, and wherein a bisector of an angle of an apex where the near-field light is generated is different from a medium traveling direction.

6. The magnetic recording apparatus according to claim 1, wherein the heating mechanism includes a conductive light scattering body for generating near-field light and a waveguide for making light incident on the conductive light scattering body, wherein the conductive light scattering body is triangular, and wherein at least a portion of a base connecting two points other than an apex where the near-field light is generated is arranged outside of the track edge of the magnetic pole.

7. The magnetic recording apparatus according to claim 1, wherein the heating mechanism includes:
   a metal having an E-shaped minute aperture of a size not larger than a light wavelength for generating near-field light; and
   a waveguide for making light incident on the E-shaped aperture.

8. The magnetic recording apparatus according to claim 1, wherein magnetic recording of a shingle recording system is performed in which recording is performed in one direction while track edges are overlappingly written in a medium radius direction, and wherein the heating mechanism primarily heats the center of the heating area that is arranged at a remaining track edge side of the recording pattern as compared with the width-direction center position of the magnetic pole.

9. The magnetic recording apparatus according to claim 1, wherein a switching magnetic field at a time of non-heating of the magnetic recording medium is lower than a recording magnetic field intensity applied from the magnetic pole.

10. A magnetic recording apparatus comprises:
    a magnetic recording medium;
    a magnetic head having a magnetic pole for applying a recording magnetic field to the magnetic recording medium; and
    a heating mechanism for locally heating the magnetic recording medium, wherein the heating mechanism heats a position shifted in a track edge direction from a track width direction center at a trailing side of the magnetic pole,
    wherein a switching magnetic field at a time of non-heating of the magnetic recording medium is lower than a recording magnetic field intensity applied from the magnetic pole, and when a width in which an amount of reduction of the switching magnetic field of the magnetic recording medium is half an amount of reduction at a heating center position is a spot size, an offset amount of the heating center position by the heating mechanism from the track width direction center of the magnetic pole, the spot size of the heating mechanism, and the magnetic pole width satisfy a following relation:

the offset amount<the magnetic pole width/2, the spot size<the offset amount×2, the spot size>the magnetic pole width/2−offset amount.

11. A magnetic recording apparatus comprises:
    a magnetic recording medium;
    a magnetic head having a magnetic pole for applying a recording magnetic field to the magnetic recording medium; and a heating mechanism for locally heating the magnetic recording medium, wherein the heating mechanism heats a position shifted in a track edge direction from a track width direction center at a trailing side of the magnetic pole, wherein a switching magnetic field at a time of non-heating of the magnetic recording medium is higher than a recording magnetic field intensity applied from the magnetic pole, and when a width in which an amount of reduction of the switching magnetic field of the magnetic recording medium is half an amount of reduction at a heating center position is a spot size, an offset amount of the heating center position by the heating mechanism from the track width direction center of the magnetic pole, the spot size of the heating mechanism, and the magnetic pole width satisfy a following relation:

0.1×the spot size<the offset amount<0.3×the spot size, the magnetic pole width>12×the offset amount−2×the spot size, the magnetic pole width>−30×the offset amount+5× the spot size.

12. A magnetic recording method for magnetically recording information to a magnetic recording medium, the magnetic recording method comprising:

applying a recording magnetic field from a recording magnetic pole to the magnetic recording medium; and locally heating a center of a heating area that is arranged at a track edge side of a recording pattern as compared with a width-direction center position of the recording magnetic pole at a trailing side of the recording magnetic pole.

13. The magnetic recording method according to claim 12, wherein two heating areas are locally heated and centers of the heating areas are positioned on either side of the width-direction center position in the width-direction at the trailing side of the recording magnetic pole.

14. The magnetic recording method according to claim 12, wherein recording is performed in one direction while track edges are overlappingly written in a medium radius direction, and wherein the center of the heating area is arranged at a remaining track edge side of the recording pattern as compared with the width-direction center position of the magnetic pole.

* * * * *

UNITED STATES PATENT AND TRADEMARK OFFICE
CERTIFICATE OF CORRECTION

PATENT NO. : 8,264,918 B2  Page 1 of 1
APPLICATION NO. : 12/537141
DATED : September 11, 2012
INVENTOR(S) : Hashimoto et al.

It is certified that error appears in the above-identified patent and that said Letters Patent is hereby corrected as shown below:

In the specification:

col. 3, line 2, replace "patterns" with --pattern--;

col. 4, line 45, replace "tie" with --the--;

col. 5, line 38, replace "preformed" with --performed--;

col. 6, line 26, replace "stricture" with --structure--;

col. 9, line 31, replace "chanced" with --changed--.

Signed and Sealed this
Twenty-ninth Day of January, 2013

David J. Kappos
*Director of the United States Patent and Trademark Office*